United States Patent
Sander et al.

(10) Patent No.: US 10,715,534 B2
(45) Date of Patent: Jul. 14, 2020

(54) COLLABORATIVE SECURITY LSTS

(71) Applicant: ENTIT SOFTWARE LLC, Sanford, NC (US)

(72) Inventors: Tomas Sander, Princeton, NJ (US); Prasad V. Rao, Princeton, NJ (US); Brian Frederik Hosea Che Hein, Aliso Viejo, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 302 days.

(21) Appl. No.: 15/544,343

(22) PCT Filed: Jan. 30, 2015

(86) PCT No.: PCT/US2015/013900
§ 371 (c)(1),
(2) Date: Jul. 18, 2017

(87) PCT Pub. No.: WO2016/122638
PCT Pub. Date: Aug. 4, 2016

(65) Prior Publication Data
US 2018/0013774 A1    Jan. 11, 2018

(51) Int. Cl.
*H04L 29/06* (2006.01)
(52) U.S. Cl.
CPC ........ *H04L 63/1416* (2013.01); *H04L 63/101* (2013.01); *H04L 63/1441* (2013.01)
(58) Field of Classification Search
CPC ... H04L 63/14; H04L 63/1416; H04L 63/101; H04L 63/1441; G06F 21/31; G06Q 10/10
See application file for complete search history.

(56) References Cited

U.S. PATENT DOCUMENTS 7,373,385 B2    5/2008  Prakash
8,290,809 B1 *  10/2012 Ratterman ............. G06Q 10/10
                                                          705/319
(Continued)

FOREIGN PATENT DOCUMENTS

EP          2278516 A1     1/2011
WO      WO-2013163625 A1  10/2013

OTHER PUBLICATIONS

Don Turnbull, "Rating, Voting & Ranking: Designing for Collaboration & Consensus," CHI 2007, Apr. 28-May 3, 2007; San Jose, California USA, pp. 1-6, ACM.

(Continued)

*Primary Examiner* — Shanto Abedin

(57) ABSTRACT

Examples relate to collaborative security lists. The examples disclosed herein enable obtaining a first candidate entry suggested by a first user of a community to be included in a collaborative security list. The collaborative security list may comprise a list of entries known to be secure or a list of entries known to be insecure. The examples disclosed herein further enable providing a candidate security list comprising at least the first candidate entry to the community and obtaining, from a second user of the community, a first score indicating how confident the second user is that the first candidate entry is secure. The examples disclosed herein further enable determining whether to include the first candidate entry in the collaborative security list based on the first score.

19 Claims, 5 Drawing Sheets

(56) References Cited

U.S. PATENT DOCUMENTS

| | | | |
|---|---|---|---|
| 8,468,195 B1 | 6/2013 | Gannu et al. | |
| 8,826,426 B1 * | 9/2014 | Dubey | H04L 63/14 726/22 |
| 8,826,444 B1 * | 9/2014 | Kalle | H04N 21/25816 709/223 |
| 9,009,827 B1 * | 4/2015 | Albertson | H04L 63/14 726/22 |
| 10,402,381 B2 * | 9/2019 | Horvatin | H04L 51/22 |
| 2003/0056093 A1 * | 3/2003 | Huitema | H04L 29/12009 713/156 |
| 2005/0114452 A1 * | 5/2005 | Prakash | H04L 51/12 709/206 |
| 2006/0253584 A1 * | 11/2006 | Dixon | G06Q 30/02 709/225 |
| 2007/0130350 A1 * | 6/2007 | Alperovitch | H04L 63/1425 709/229 |
| 2007/0174630 A1 * | 7/2007 | Shannon | G06F 21/31 713/183 |
| 2008/0082662 A1 | 4/2008 | Dandliker et al. | |
| 2008/0256622 A1 * | 10/2008 | Neystadt | H04L 63/1416 726/14 |
| 2010/0073373 A1 * | 3/2010 | Groff | G06Q 10/10 345/440 |
| 2010/0174793 A1 | 7/2010 | Wieneke et al. | |
| 2011/0113098 A1 * | 5/2011 | Walsh | G06Q 10/00 709/204 |
| 2011/0289216 A1 | 11/2011 | Szeto et al. | |
| 2013/0227016 A1 * | 8/2013 | Risher | G06Q 10/10 709/204 |
| 2014/0019537 A1 * | 1/2014 | Doshi | G06Q 10/10 709/204 |

OTHER PUBLICATIONS

International Searching Authority, International Search Report and Written Opinion; PCT/US2015/013900; dated Oct. 28, 2015; 16 pages.

Kiersten Moffatt, "ICE Web Filter Announces Collaborative Tool for Educators," Mar. 29, 2011, pp. 1-2, ICE Web Filter.

* cited by examiner

US 10,715,534 B2

COLLABORATIVE SECURITY LISTS

BACKGROUND

A security list may comprise a list of entries known to be secure (e.g., whitelist) or a list of entries known to be insecure (e.g., blacklist). For example, those on the list of entries known to be secure (e.g., benign, not malicious, etc.) may be approved and/or authorized to be executed and/or to access certain resources. On the other hand, the list of entries known to be insecure (e.g., malicious) may be used to block, filter out, and/or deny access to certain resources by an event that matches at least one of the listed entries that could pose security threats and/or to generate a security alert when the match is detected.

BRIEF DESCRIPTION OF THE DRAWINGS

The following detailed description references the drawings, wherein.

DETAILED DESCRIPTION

Figure 1:
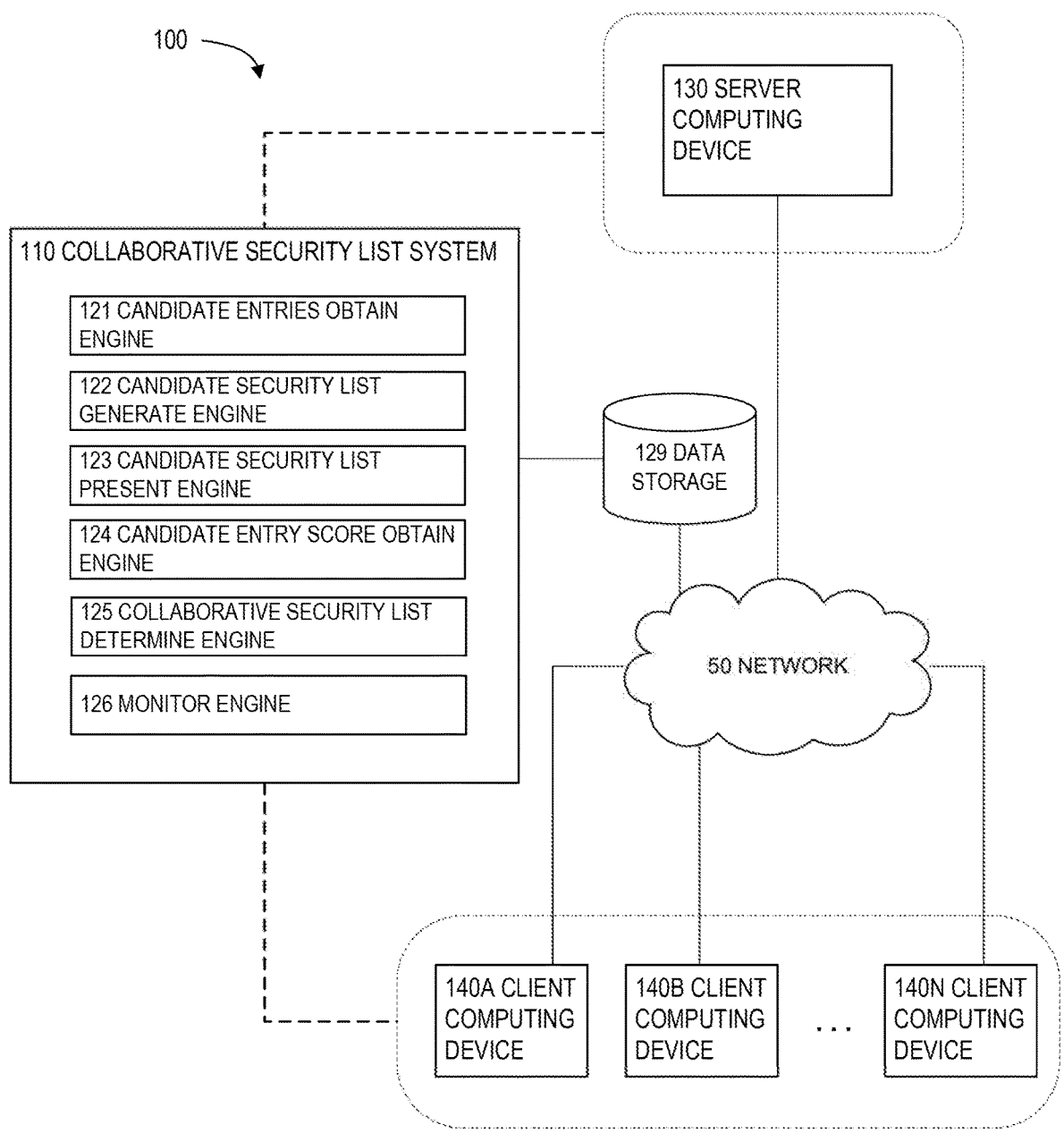
FIG. 1 is a block diagram depicting an example environment in which various examples may be implemented as a collaborative security list system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Users of a security information sharing platform typically share security indicators, security alerts, and/or other security-related information (e.g., mitigations strategies, attackers, attack campaigns and trends, threat intelligence information, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected users.

A security list may comprise a list of entries known to be secure (e.g., whitelist) or a list of entries known to be insecure (e.g., blacklist). For example, those on the list of entries known to be secure (e.g., benign, not malicious, etc.) may be approved and/or authorized to be executed and/or to access certain resources. On the other hand, the list of entries known to be insecure (e.g., malicious) may be used to block, filter out, and/or deny access to certain resources by an event that matches at least one of the listed entries that could pose security threats and/or to generate a security alert when the match is detected.

Inaccurate and/or outdated security lists may cause benign security indicators to be inadvertently blocked or malicious security indicators to be inadvertently allowed.

Examples disclosed herein provide technical solutions to these technical challenges by collaboratively developing such security lists by a community of the security indicator sharing platform while utilizing the knowledge and skills of various users of the platform, effectively improving the accuracy and timeliness of the security lists. The examples disclosed herein enable obtaining a first candidate entry suggested by a first user of a community to be included in a collaborative security list. The collaborative security list may comprise a list of entries known to be secure or a list of entries known to be insecure. The examples disclosed herein further enable providing a candidate security list comprising at least the first candidate entry to the community and obtaining, from a second user of the community, a first score indicating how confident the second user is that the first candidate entry is secure. The examples disclosed herein further enable determining whether to include the first candidate entry in the collaborative security list based on the first score.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a collaborative security list system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, collaborative security list system 110 and the various components described herein may be implemented in hardware and/or a combination of hardware and programming that configures hardware. Furthermore, in FIG. 1 and other Figures described herein, different numbers of components or entities than depicted may be used.

Collaborative security list system 110 may comprise a candidate entries obtain engine 121, a candidate security list generate engine 122, a candidate security list present engine 123, a candidate entry score obtain engine 124, a collaborative security list determine engine 125, a monitor engine 126, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Candidate entries obtain engine 121 may obtain a set of candidate entries suggested by a user (e.g., first user) of a community to be included in a collaborative security list. For example, the user may collect the set of candidate entries that the user has been successfully interacting with in the past and/or that the user has a high level of confidence that the entries are secure. In another example, the set of candidate entries may include a list of critical services (e.g., bank sites) which the user does not want to see blocked. Moreover, the user may also submit, along with the set of candidate entries, context information related to at least one candidate entry of the set of candidate entries. The "context information," as used herein, may comprise a comment and/or reason (e.g., for suggesting a particular candidate entry, for giving a particular candidate entry score, etc.), supporting evidence, and/or other information that describe the candidate entry.

The "collaborative security list," as used herein, may comprise a list of entries known to be secure (e.g., whitelist) or a list of entries known to be insecure (e.g., blacklist). For example, those on the list of entries known to be secure (e.g., benign, not malicious, etc.) may be approved and/or authorized to be executed and/or to access certain resources. On the other hand, the list of entries known to be insecure (e.g., malicious) may be used to block, filter out, and/or deny access to certain resources by an event that matches at least one of the listed entries that could pose security threats and/or to generate a security alert when the match is detected.

Such security lists may be developed collaboratively by multiple users. In some implementations, the collaborative security list may be developed collaboratively by a community of users. In this case, the collaborative security list may serve as a community-level security list associated with the particular community. Different communities may maintain different community-level security lists. In some implementations, the collaborative security list may be modified and/or combined with at least a portion of another collaborative security list.

A "user," as used herein, may include an individual, organization, or any entity. A "community" may include a plurality of users. For example, a community may include a plurality of individuals in a particular area of interest. In some implementations, a community may include at least one sub-community or sub-group. The first user of the community may identify and/or submit the set of candidate entries to be included in the collaborative security list. Any other users of the community may also identify and/or submit their own set of candidate entries to be included in the collaborative security list. Each set of candidate entries may be associated with a particular user of the community who made the suggestion of that set of candidate entries. As such, the set of candidate entries associated with a particular user may represent a user-level security list of that user. The user-level security list may serve as that user's own whitelist or blacklist. For example, when an event is detected that matches an entry of the user-level blacklist of a particular user, a security alert may be generated to notify the user, but not other users.

The "entries" of the collaborative security list may include security indicators such as IP addresses, domain names, e-mail addresses, Uniform Resource Locators (URLs), software file hashes, etc. A security indicator may be an observable (e.g., "a new file is created by executable") and a composite of observables (e.g., "a new file is created by an executable" and "an executable connects to domain X"). The "security alert," as used herein, may refer to an indication, a notification, and/or a message that at least one security indicator is detected in event data. "Event data," as used herein, may comprise information related to events occurring in network, servers, applications, databases, and/or various components of any computer system. For example, the event data may include network traffic data such as IP addresses, e-mail addresses, URLs, software files, etc. In some instances, when an event of the event data matches (or otherwise include) at least one entry of the collaborative whitelist, the event may be allowed to be executed and/or access certain resources. On the other hand, when an event of the event data matches (or otherwise include) at least one entry of the collaborative blacklist, the event may be blocked and/or prevented from being executed and/or from accessing certain resources. A security alert may also be generated that indicates a security indicator has been detected.

Candidate security list generate engine 122 may obtain the set of candidate entries (e.g., including a first candidate entry) suggested by the first user and/or any other sets of candidate entries suggested by other users of the community. Candidate security list generate engine 122 may generate a candidate security list that may comprise at least the set of candidate entries suggested by the first user and/or any other obtained sets. A "candidate security list," as used herein, may refer to an intermediate security list with candidate entries that may be provided to the community for voting, scoring, and/or ranking by the users of the community. The results of such voting, scoring, and/or ranking may be used to generate the collaborative security list, which is described in greater detail herein with respect to collaborative security list determine engine 125.

In some implementations, candidate security list generate engine 122 may merge, format, sort, edit, and/or perform other actions on the set of candidate entries and/or other obtained sets to generate the candidate security list. In some implementations, the candidate security list may contain user-related information (e.g., a user identification (ID), a user profile, etc.) of the user who suggested a particular candidate entry. The user profile may comprise a user reputation score, membership to a sub-community of the community, education, skills, expertise, area of interest, etc.

In some implementations, the candidate security list may include candidate entries from log data. The log data may be system-generated, which may include, for example, web logs, Domain Name System (DNS) logs, etc. For example, frequently accessed domains or IP addresses may provide a good indication that they are secure and can be suggested to be included in the collaborative security list.

Candidate security list present engine 123 may provide and/or present the candidate security list to the community or at least one user of the community. A user (e.g., second user) of the community may, via a user interface, view the candidate security list (e.g., candidate entries, associated user-related information, other associated context information, etc.). In some implementations, the candidate security list may be further shared with users from other communities. The users to whom the candidate security list is provided and/or presented may submit a score for at least one candidate entry of the candidate security list, which is discussed herein with respect to candidate entry score obtain engine 124.

In some implementations, candidate security list present engine 123 may identify a portion of the candidate security list that is related to a user profile of the second user of the community and/or present, to the second user, the candidate security list having the portion of the candidate security list being visually different (e.g., in a different color, highlight, font, style, etc.) from the rest of the candidate security list. In this manner, the second user may be able to make sure that the second user reviews at least the visually different entries and submit/or appropriate scores for those entries. For example, the second user may belong to a sub-community of the community. The sub-community may be related to a financial aspect of the business. In this example, based on the membership information in the second user's user profile, those entries related to finances (e.g., IP addresses or domain names for banks or other financial organizations) may be highlighted.

Candidate entry score obtain engine 124 may obtain, from the second user of the community (and/or other users of the community), a candidate entry score on at least one candidate entry of the candidate security list. For example, the candidate entry score may indicate how confident the second user is that the candidate entry is secure. In some implementations, the score may be a numerical value (e.g., on a scale from a minimum value to a maximum value) and/or a vote (e.g., yes/no, positive/negative, neutral, etc.). For example, the second user may submit a numeral score on a scale from 0 to 1. The numeral value of "0" may represent that the second user is not confident that the candidate entry is secure while the numeral value of "1" may represent that the second user is confident that the candidate entry is secure. Any value in between the minimum value and the maximum value may indicate a varying degree of confidence the second user has about the candidate entry. In another example, the second user may vote for, against, or neutral to a particular candidate entry. In some situations, the vote may be converted to a numerical value (e.g., "1" for being secure, "0" for being neutral, "−1" for being insecure, etc.).

In some implementations, candidate entry score obtain engine 124 may obtain, from the second user of the community (and/or other users of the community), context information related to the at least one candidate entry. For example, the user may indicate that the candidate site address is voted against because the website has been classified as a malware distribution site. The user may submit detailed rationale for the candidate entry score given by the user: the website has been implicated in an attack on the user's organization in the past 2 years, or the website address appeared on blacklists from the threat intelligence vendors.

Collaborative security list determine engine 125 may determine whether to include the at least one candidate entry in the collaborative security list based on at least one of the following parameters: candidate entry scores (e.g., obtained from the second user and/or other users of the community), context information (e.g., a comment and/or reason for the candidate entry score given by a user, supporting evidence, and/or other information that describe the candidate entry, etc.), user profiles (e.g., of the second user and/or other users of the community), information related to the at least one candidate entry (e.g., sightings of the at least one candidate entry in event data), and/or other parameters.

As discussed above, the user profile of a user may include the user's reputation score, membership to a sub-community of the community, education, skills, expertise, area of interest, etc. The user reputation score may be determined based on the number of candidate entries previously suggested by the user, the number of candidate entries previously suggested by the user and included in at least one collaborative security list, and/or other information in the user profile (e.g., the user's membership a particular sub-community may influence the user reputation score).

In some implementations, collaborative security list determine engine 125 may determine whether to include the at least one candidate entry in the collaborative security list by determining a combined score for the at least one candidate entry based on at least one of the parameters discussed above. For example, the combined score may be determined by calculating the product of the candidate entry score from the second user and the reputation score of the second user and/or calculating the same using the candidate entry scores and user reputation scores of the other users who submitted the candidate entry scores. The combined score may represent the sum of or the average of the calculated products.

Other ways of determining the combined score may be used by collaborative security list determine engine 125.

In some implementations, the candidate entries from the candidate security list with the combined scores above and/or equal to a predetermined threshold value may be determined to be included in the collaborative security list. In some implementations, the top N number of the candidates entries when sorted based on the combined scores may be determined to be included in the collaborative security list.

In response to determining that the at least one candidate entry should be included in the collaborative security list, collaborative security list determine engine 125 may include the at least one candidate entry in the collaborative security list. The entries in the collaborative security list may be sorted based on the combined scores. In some implementations, at least one user of the community may have veto power to reject the inclusion of the at least one candidate entry in the collaborative security list. In these implementations, collaborative security list determine engine 125 may include the at least one candidate entry in the collaborative security list unless the inclusion is rejected by the at least one user who has the veto power.

Monitor engine 126 may monitor event data. As discussed above, "event data," as used herein, may comprise information related to events occurring in network, servers, applications, databases, and/or various components of any computer system. For example, the event data may include network traffic data such as IP addresses, e-mail addresses, URLs, software files, etc. Monitor engine 126 may detect an event in the event data that matches at least one entry of the collaborative security list. In other words, monitor engine 126 may detect, in the event data, a security indicator that corresponds to at least one entry of the collaborative security list. In response to the detection, monitor engine 126 may allow the execution of the event or generates a security alert. For example, when an event of the event data matches (or otherwise include) at least one entry of the collaborative whitelist, the event may be allowed to be executed and/or access certain resources. On the other hand, when an event of the event data matches (or otherwise include) at least one entry of the collaborative blacklist, the event may be blocked and/or prevented from being executed and/or from accessing certain resources. A security alert may also be generated that indicates a security indicator has been detected.

In performing their respective functions, engines 121-126 may access data storage 129 and/or other suitable database(s). Data storage 129 may represent any memory accessible to collaborative security list system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Collaborative security list system 110 may access data storage 129 locally or remotely via network 50 or other networks.

Data storage 129 may include a database to organize and store data. Database 129 may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may reside in a single or multiple physical device(s) and in a single or multiple physical location(s). The database may store a plurality of types of data and/or files and associated data or file description, administrative information, or any other data.

Figure 2:
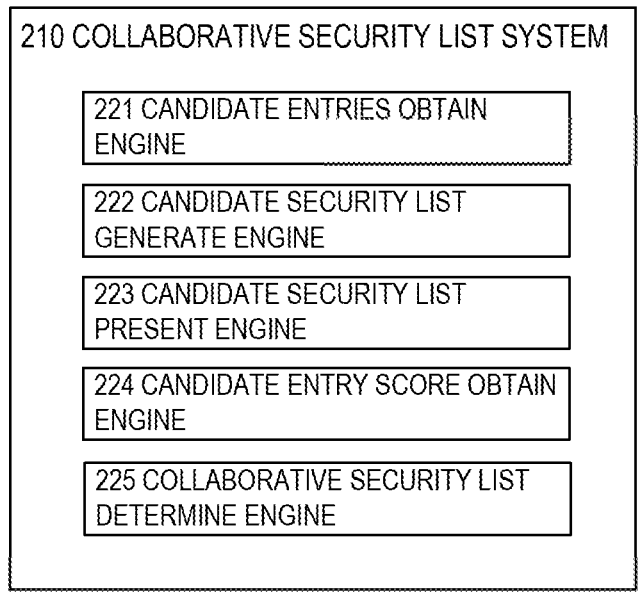
FIG. 2 is a block diagram depicting an example collaborative security list system.

FIG. 2 is a block diagram depicting an example collaborative security list system 210. Collaborative security list system 210 may comprise a candidate entries obtain engine 221, a candidate security list generate engine 222, a candidate security list present engine 223, a candidate entry score obtain engine 224, a collaborative security list determine engine 225, and/or other engines. Engines 221-225 represent engines 121-125, respectively.

Figure 3:
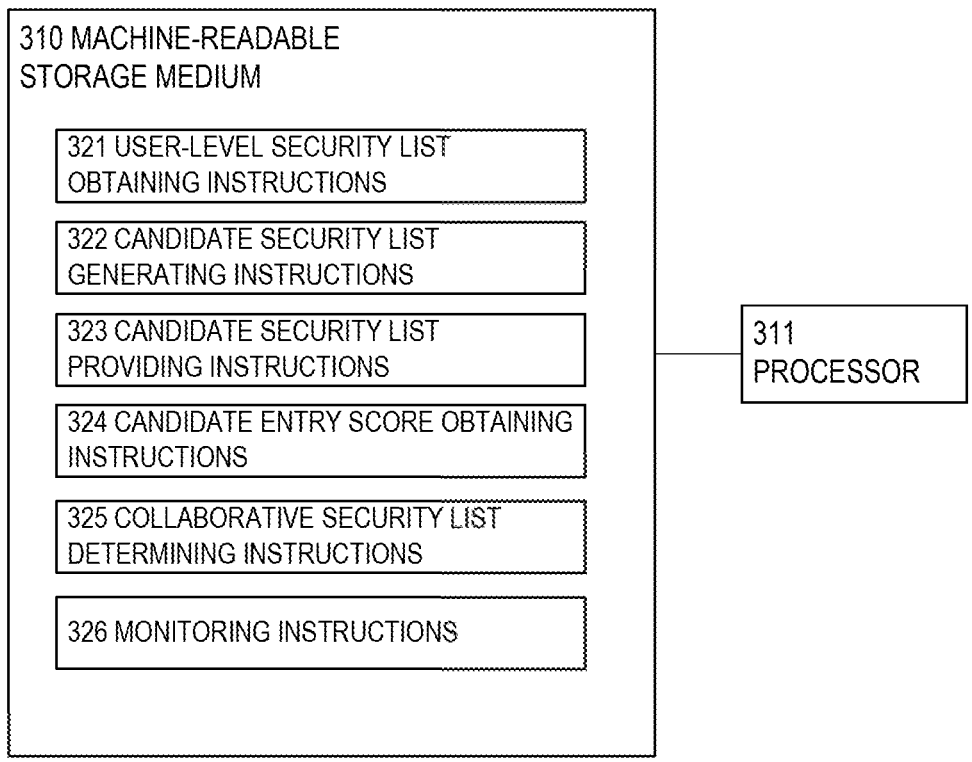
FIG. 3 is a block diagram depicting an example machine-readable storage medium comprising instructions executable by a processor for collaborative security lists.

FIG. 3 is a block diagram depicting an example machine-readable storage medium 310 comprising instructions executable by a processor for collaborative security lists.

In the foregoing discussion, engines 121-126 were described as combinations of hardware and programming. Engines 121-126 may be implemented in a number of fashions. Referring to FIG. 3, the programming may be processor executable instructions 321-326 stored on a machine-readable storage medium 310 and the hardware may include a processor 311 for executing those instructions. Thus, machine-readable storage medium 310 can be said to store program instructions or code that when executed by processor 311 implements collaborative security list system 110 of FIG. 1.

In FIG. 3, the executable program instructions in machine-readable storage medium 310 are depicted as user-level security list obtaining instructions 321, candidate security list generating instructions 322, candidate security list providing instructions 323, candidate entry score obtaining instructions 324, collaborative security list determining instructions 325, and monitoring instructions 326. Instructions 321-326 represent program instructions that, when executed, cause processor 311 to implement engines 121-126, respectively.

Figure 4:
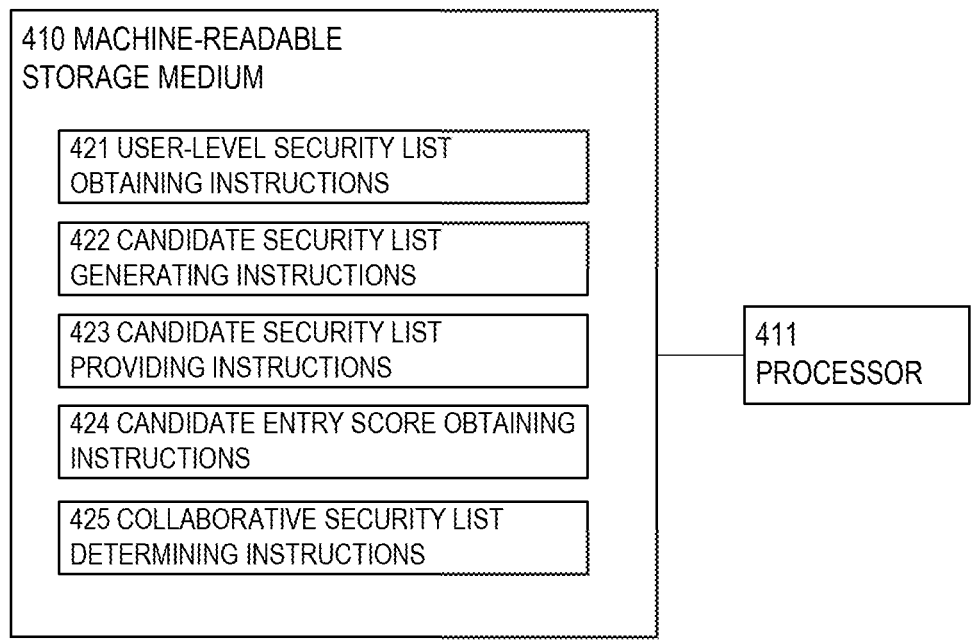
FIG. 4 is a block diagram depicting an example machine-readable storage medium comprising instructions executable by a processor for collaborative security lists.

FIG. 4 is a block diagram depicting an example machine-readable storage medium 410 comprising instructions executable by a processor for collaborative security lists.

In the foregoing discussion, engines 121-126 were described as combinations of hardware and programming. Engines 121-126 may be implemented in a number of fashions. Referring to FIG. 4, the programming may be processor executable instructions 421-425 stored on a machine-readable storage medium 410 and the hardware may include a processor 411 for executing those instructions. Thus, machine-readable storage medium 410 can be said to store program instructions or code that when executed by processor 411 implements collaborative security list system 110 of FIG. 1.

In FIG. 4, the executable program instructions in machine-readable storage medium 410 are depicted as user-level security list obtaining instructions 421, candidate security list generating instructions 422, candidate security list providing instructions 423, candidate entry score obtaining instructions 424, and collaborative security list determining instructions 425. Instructions 421-425 represent program instructions that, when executed, cause processor 411 to implement engines 121-125, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement collaborative security list system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-326, and/or other instructions. As an alternative or in addition to retrieving and executing instructions, processor 311 may include at least one electronic circuit comprising a number of electronic components for performing the functionality of at least one of instructions 321-326, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-425, and/or other instructions. As an alternative or in addition to retrieving and executing instructions, processor 411 may include at least one electronic circuit comprising a number of electronic components for performing the functionality of at least one of instructions 421-425, and/or other instructions.

Figure 5:
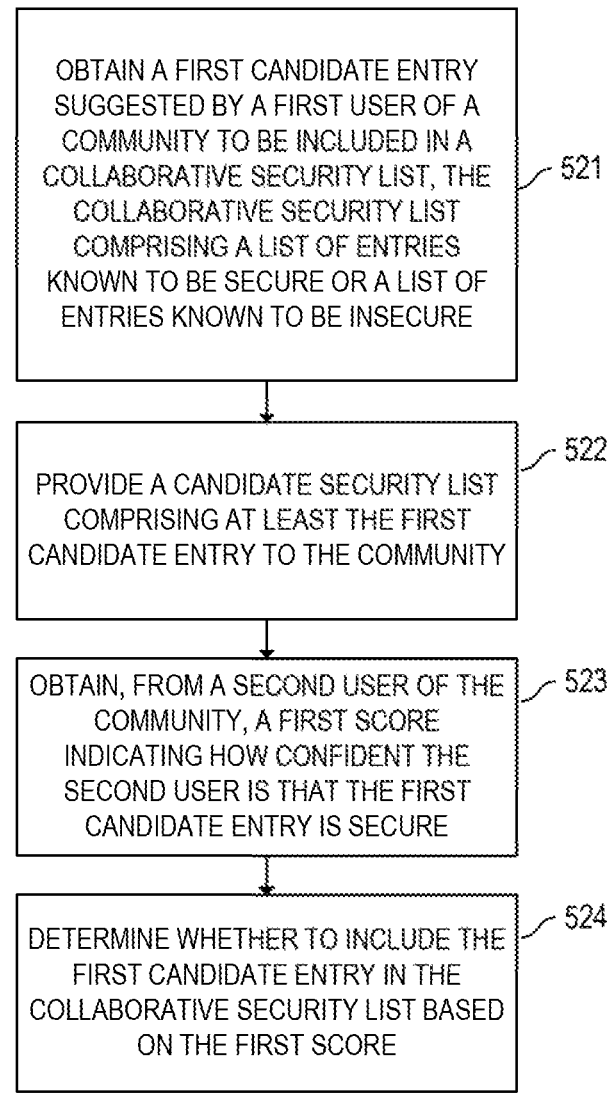
FIG. 5 is a flow diagram depicting an example method for collaborative security lists.

FIG. 5 is a flow diagram depicting an example method 500 for collaborative security lists. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include obtaining a first candidate entry suggested by a first user of a community to be included in a collaborative security list. For example, the user may identify the first candidate entry that the user has been successfully interacting with in the past and/or that the user has a high level of confidence that the entry is secure. Moreover, the user may also submit, along with the first candidate entry, context information related to the first candidate entry. The "context information," as used herein, may comprise a comment and/or reason (e.g., for suggesting a particular candidate entry, for giving a particular candidate entry score, etc.), supporting evidence, and/or other information that describe the candidate entry.

In block 522, method 500 may include providing a candidate security list comprising at least the first candidate entry to the community. A "candidate security list," as used herein, may refer to an intermediate security list with candidate entries that may be provided to the community for voting, scoring, and/or ranking by the users of the community. The results of such voting, scoring, and/or ranking may be used to generate the collaborative security list, which is described in greater detail herein with respect to block 524.

In block 523, method 500 may include obtaining, from a second user of the community, a first score indicating how confident the second user is that the first candidate entry is secure. In some implementations, the first score may be a numerical value (e.g., on a scale from a minimum value to a maximum value) and/or a vote (e.g., yes/no, positive/negative, neutral, etc.). For example, the second user may submit a numeral score on a scale from 0 to 1. The numeral value of "0" may represent that the second user is not confident that the first candidate entry is secure while the numeral value of "1" may represent that the second user is confident that the first candidate entry is secure. Any value in between the minimum value and the maximum value may indicate a varying degree of confidence the second user has about the first candidate entry. In another example, the second user may vote for, against, or neutral to the first candidate entry. In some situations, the vote may be converted to a numerical value (e.g., "1" for being secure, "0" for being neutral, "−1" for being insecure, etc.).

In block 524, method 500 may include determining whether to include the first candidate entry in the collaborative security list based on the first score and/or any one of the following parameters: context information (e.g., a comment and/or reason for the first score given by the second user, supporting evidence, and/or other information that describe the first candidate entry, etc.), a user profile (e.g., of the second user), information related to the first candidate entry (e.g., sightings of the first candidate entry in event data), and/or other parameters.

Referring back to FIG. 1, candidate entries obtain engine 121 may be responsible for implementing block 521. Candidate security list present engine 123 may be responsible for implementing block 522. Candidate entry score obtain engine 124 may be responsible for implementing block 523. Collaborative security list determine engine 125 may be responsible for implementing block 524.

Figure 6:
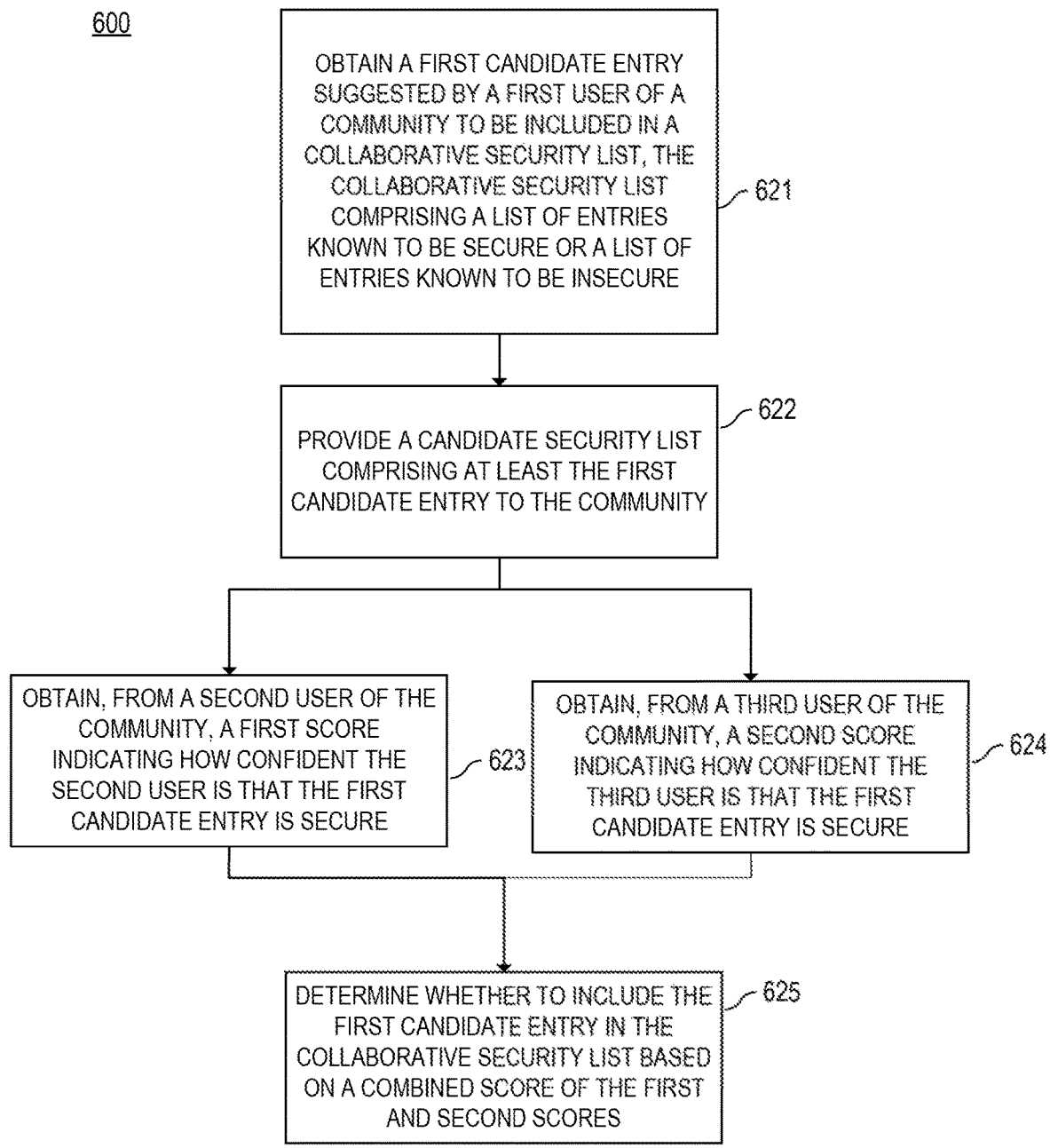
FIG. 6 is a flow diagram depicting an example method for collaborative security lists.

FIG. 6 is a flow diagram depicting an example method 600 for collaborative security lists. Method 600 as illustrated (and described in greater detail below) is meant be an example and, as such, should not be viewed as limiting.

Method 600 may be implemented in the form of executable instructions stored on a machine-readable storage medium, such as storage medium 210, and/or in the form of electronic circuitry.

In block 621, method 600 may include obtaining a first candidate entry suggested by a first user of a community to be included in a collaborative security list. For example, the user may identify the first candidate entry that the user has been successfully interacting with in the past and/or that the user has a high level of confidence that the entry is secure. Moreover, the user may also submit, along with the first candidate entry, context information related to the first candidate entry. The "context information," as used herein, may comprise a comment and/or reason (e.g., for suggesting a particular candidate entry, for giving a particular candidate entry score, etc.), supporting evidence, and/or other information that describe the candidate entry.

In block 622, method 600 may include providing a candidate security list comprising at least the first candidate entry to the community. A "candidate security list," as used herein, may refer to an intermediate security list with candidate entries that may be provided to the community for voting, scoring, and/or ranking by the users of the community. The results of such voting, scoring, and/or ranking may be used to generate the collaborative security list, which is described in greater detail herein with respect to block 625.

In block 623, method 600 may include obtaining, from a second user of the community, a first score indicating how confident the second user is that the first candidate entry is secure. In some implementations, the first score may be a numerical value (e.g., on a scale from a minimum value to a maximum value) and/or a vote (e.g., yes/no, positive/negative, neutral, etc.). For example, the second user may submit a numeral score on a scale from 0 to 1. The numeral value of "0" may represent that the second user is not confident that the first candidate entry is secure while the numeral value of "1" may represent that the second user is confident that the first candidate entry is secure. Any value in between the minimum value and the maximum value may indicate a varying degree of confidence the second user has about the first candidate entry. In another example, the second user may vote for, against, or neutral to the first candidate entry. In some situations, the vote may be converted to a numerical value (e.g., "1" for being secure, "0" for being neutral, "−1" for being insecure, etc.). Similarly, in block 624, method 600 may include obtaining, from a third user of the community, a second score indicating how confident the third user is that the first candidate entry is secure.

In block 625, method 600 may include determining whether to include the first candidate entry in the collaborative security list based on a combined score of the first and second scores and/or any one of the following parameters: context information (e.g., a comment and/or reason for the first or second score given by the second or third user, supporting evidence, and/or other information that describe the first candidate entry, etc.), a user profile (e.g., of the second or third user), information related to the first candidate entry (e.g., sightings of the first candidate entry in event data), and/or other parameters.

The combined score may be determined by, for example, calculating the product of the first score from the second user and the reputation score of the second user and/or calculating the same using the second score from the third user and the reputation score of the third user. The combined score may represent the sum of or the average of the calculated products. Other ways of determining the combined score may be used by method 600.

In some implementations, the candidate entries from the candidate security list with the combined scores above and/or equal to a predetermined threshold value may be determined to be included in the collaborative security list. In some implementations, the top N number of the candidates entries when sorted based on the combined scores may be determined to be included in the collaborative security list.

Referring back to FIG. 1, candidate entries obtain engine 121 may be responsible for implementing block 621. Candidate security list present engine 123 may be responsible for implementing block 622. Candidate entry score obtain engine 124 may be responsible for implementing blocks 623-624. Collaborative security list determine engine 125 may be responsible for implementing block 625.

The foregoing disclosure describes a number of example implementations for collaborative security lists. The disclosed examples may include systems, devices, computer-readable storage media, and methods for collaborative security lists. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method performed by a system comprising a hardware processor, comprising:
   receiving a first candidate entry suggested by a first user of a community to be included in a collaborative security list, the collaborative security list comprising a list of entries known to be secure or a list of entries known to be insecure;
   providing a candidate security list comprising the first candidate entry to the community;
   receiving, from a second user of the community, a first score indicating how confident the second user is that the first candidate entry is secure;
   determining a reputation score of the second user that provided the first score, the reputation score determined based on a number of candidate entries previously suggested by the second user and included in one or more collaborative security lists;
   determining whether to include the first candidate entry in the collaborative security list based on the first score and the reputation score of the second user; and in response to determining to include the first candidate entry in the collaborative security list, adding the first candidate entry in the collaborative security list for event monitoring to detect a security threat.

2. The method of claim 1, further comprising:
receiving a second candidate entry suggested by a third user of the community to be included in the collaborative security list;
providing the candidate security list comprising the first and second candidate entries to the community;
receiving, from the second user, a second score indicating how confident the second user is that the second candidate entry is secure; and
determining whether to include the second candidate entry in the collaborative security list based on the second score and the reputation score of the second user.

3. The method of claim 1, further comprising:
receiving, from a third user of the community, a second score indicating how confident the third user is that the first candidate entry is secure;
determining a reputation score of the third user that provided the second score, the reputation score of the third user determined based on a number of candidate entries previously suggested by the third user and included in one or more collaborative security lists; and
determining whether to include the first candidate entry in the collaborative security list based on a combination of the first score, the second score, the reputation score of the second user, and the reputation score of the third user.

4. The method of claim 3, further comprising:
computing a first combined score based on combining the first score and the reputation score of the second user;
computing a second combined score based on combining the second score and the reputation score of the third user,
wherein the determining of whether to include the first candidate entry in the collaborative security list is based on the first combined score and the second combined score.

5. The method of claim 4, wherein the determining of whether to include the first candidate entry in the collaborative security list is based on aggregating the first combined score and the second combined score.

6. The method of claim 1, wherein the first score is a vote or a numerical value.

7. The method of claim 1, wherein the determining of whether to include the first candidate entry in the collaborative security list is based on a value computed on a combination of the first score and the reputation score of the second user.

8. The method of claim 1, wherein the first candidate entry comprises an identifier of an entity that produced a network event, wherein the identifier is selected from among an Internet Protocol (IP) address, a domain name, an e-mail address, a Uniform Resource Locator (URL), or a hash of a software file.

9. The method of claim 1, wherein the determining of whether to include the first candidate entry in the collaborative security list is further based on context information of the first score, the context information comprising a reason for an assignment of the first score by the second user.

10. The method of claim 1, wherein the reputation score of the second user is determined further based on a skill of the second user.

11. A non-transitory machine-readable storage medium comprising instructions that upon execution cause a system to:
receive a first user-level security list from a first user of a community, the first user-level security list comprising a list of entries known to the first user to be secure or a list of entries known to the first user to be insecure;
receive a second user-level security list from a second user of the community, the second user-level security list comprising a list of entries known to the second user to be secure or a list of entries known to the second user to be insecure;
provide a candidate security list to a third user of the community, the candidate security list comprising the first user-level security list and the second user-level security list;
receive, from the third user, a candidate entry score of at least one candidate entry of the candidate security list;
determine a reputation score of the third user that provided the candidate entry score, the reputation score determined based on a number of candidate entries previously suggested by the third user and included in one or more collaborative security lists;
determine whether to include the at least one candidate entry in a collaborative security list based on the candidate entry score and the reputation score of the third user; and
in response to determining to include the at least one candidate entry in the collaborative security list, add the at least one candidate entry in the collaborative security list for event monitoring to detect a security threat.

12. The non-transitory machine-readable storage medium of claim 11, wherein the candidate security list comprises a set of candidate entries from log data.

13. The non-transitory machine-readable storage medium of claim 11, wherein the reputation score of the third user is determined further based on a skill of the third user.

14. The non-transitory machine-readable storage medium of claim 11, wherein the determining of whether to include the at least one candidate entry in the collaborative security list is based on a value computed on a combination of the candidate entry score and the reputation score of the third user.

15. The non-transitory machine-readable storage medium of claim 11, wherein at least one user of the community has veto power to reject the inclusion of the at least one candidate entry in the collaborative security list, wherein the instructions upon execution cause the system to:
in response to determining to include the at least one candidate entry in the collaborative security list, add the at least one candidate entry in the collaborative security list unless the inclusion of the at least one candidate entry in the collaborative security list is rejected by the at least one user.

16. A system comprising:
a processor; and
a non-transitory storage medium storing instructions executable on the processor to:
receive a set of candidate entries suggested by a first user of a community to be included in a collaborative security list, the collaborative security list comprising a list of entries known to be secure or a list of entries known to be insecure;
generate a candidate security list comprising the set of candidate entries;

identify a portion of the candidate security list that is related to a user profile of a second user of the community;

cause presentation, in a user interface to the second user, the candidate security list having the portion of the candidate security list being visually different, in the user interface, from the rest of the candidate security list;

receive, from the second user via the user interface, a candidate entry score of at least one candidate entry of the candidate security list;

determine a reputation score of the second user that provided the candidate entry score, the reputation score determined based on a number of candidate entries previously suggested by the second user and included in one or more collaborative security lists;

determine whether to include the at least one candidate entry in the collaborative security list based on the candidate entry score and the reputation score of the second user; and in response to determining to include the at least one candidate entry in the collaborative security list, add the at least one candidate entry in the collaborative security list for event monitoring to detect a security threat.

17. The system of claim 16, wherein the instructions are executable on the processor to:

receive, from the second user, context information related to the at least one candidate entry, the context information comprising a reason for an assignment of the candidate entry score by the second user; and determine whether to include the at least one candidate entry in the collaborative security list further based on the context information.

18. The system of claim 16, wherein the instructions are executable on the processor to:

monitor event data;

detect an event in the event data that matches at least one entry of the collaborative security list; and in response to the detection, allow an execution of the event or block the execution of the event.

19. The system of claim 16, wherein the portion of the candidate security list that is visually different has a different color or a different highlighting than the rest of the candidate security list in the user interface.

* * * * *